Oct. 6, 1936. S. T. WILES Re. 20,128

ELECTROTHERMIC REDUCTION OF IRON ORES

Original Filed Dec. 7, 1928 2 Sheets-Sheet 1

INVENTOR
Buffalo Electric Furnace Corporation
Assignee Of Sydney T. Wiles, deceased,
By Charles P. Franchot, President.

Beau & Brooks ATTORNEYS

ELECTROTHERMIC REDUCTION OF IRON ORES

Original Filed Dec. 7, 1928 2 Sheets-Sheet 2

INVENTOR

Buffalo Electric Furnace Corporation
Assignee Of Sydney T. Wiles, deceased.
By Charles P. Franchot, President.

Beau & Brooks. ATTORNEYS

Reissued Oct. 6, 1936 Re. 20,128

UNITED STATES PATENT OFFICE 20,128

ELECTROTHERMIC REDUCTION OF IRON ORES

Sydney T. Wiles, deceased, late of Buffalo, N. Y., by Buffalo Electric Furnace Corporation, mesne assignee, Buffalo, N. Y.

Original No. 1,837,696, dated December 22, 1931, Serial No. 324,505, December 7, 1928. Application for reissue December 20, 1933, Serial No. 703,320

20 Claims. (Cl. 75—11)

This invention relates to a method of and apparatus for the electrothermic reduction of iron ores or similar compounds, and it particularly relates to a method of reduction wherein the ore is finely divided and homogeneously admixed with a reducing agent such as charcoal and a fluxing agent such as lime, and the mixture introduced into a closed tube leading directly into an electric arc, the finely divided materials being protected from blasts of waste gases until reduced to such condition as to be substantially metalliferous in character when the materials are elevated to a temperature insuring complete reduction, and to apparatus for utilizing this and similar processes.

The extraction of iron from its ores is one of the oldest of known metallurgical processes. Of the various methods that have been proposed, two in particular have survived and are now in use. One method, the blast furnace method, which is universally employed, consists in feeding crushed iron ore, such as hematite. $Fe_2O_3$, or magnetite, $Fe_3O_4$, (the naturally occurring oxides of iron) or ores converted into oxide form by roasting, such as the carbonate or sulfide, into the top of a blast furnace. This apparatus consists of a tall stack provided with means at its lower portion for the introduction of a blast of hot air. Disposed in alternating layers with the ore are layers or strata of carbon in the form of coke and a fluxing material such as lime. The reactions of the reduction process are many and complex, but, in its essence, the action consists in burning the lower layers of coke with the hot air, to form carbon monoxide and carbon dioxide,—hot gases which flow upwardly through the charge to effect the extraction of oxygen from the iron oxide, producing ultimately a layer of impure and molten iron ("pig iron") at the bottom of the furnace, on which floats a liquid layer of slag consisting of the gangue of the ore, the fluxing agent, and various impurities of the ore which preferentially react with the lime.

As stated, there are many individual reactions occurring in the furnace, depending primarily on the temperature which varies from possibly 3000° F. at the base to 400° or 500° F. at the point of exit of waste gases. At certain temperatures carbon reacts directly with iron oxide, forming metallic iron and carbon monoxide and carbon dioxide, while at other temperatures there are formed by the same ingredients another form of oxide of iron, FeO, and carbon monoxide. The gases liberated in one portion of the stack move upwardly, reacting both with carbon and ore, depending upon the specific conditions obtaining. The blast furnace method has been so extensively used and studied that detailed explanation would not be in order here, suffice it to understand, from the foregoing comment, that the reducing action is primarily effected by the reaction of hot carbon monoxide on the raw ore.

During the past quarter century considerable serious study has been given to the electrothermic reduction of iron ore,—reduction of ore to metal by the heat of an electric arc or by means of a current of electricity flowing through the coils of a transformer. Except for certain localities where economic conditions are favorable, these processes have not supplanted the blast furnace process. A more extensve use has been found for such reduction processes wherein the product sought was an iron alloy, such as ferro-silicon, ferro-nickel, or the like, but the basic principles of the reducing action for these auxiliary methods are substantially the same as those employed in the electrothermic manufacture of pig iron. Accordingly, the latter manufacture may be referred to for example's sake.

Of the various proposals for the utilization of the electric arc in ore reduction, three may be noted here. The most satisfactory process involves the reduction of the ore in a stack furnace, the ore, carbon, and flux being fed into a tower, reacting with a circulating blast of reducing gases, and finally being treated in an arc furnace disposed at the bottom of the tower. Like the blast furnace method, this process depends upon reduction by gases generated by the action of a blast of hot air on the carbon in the charge. Another, and even more direct gaseous method of reduction, has been attempted in the laboratory by passing a current of carbon monoxide at an appropriate velocity and temperature over a batch of ore (and fluxing agent) contained in a quartz tube. Essentially, this is not an electrothermic reduction, but may here be classed as such because it originated from a study of such actions. The product is not a reduced metal in the form of a fluid pig iron, but needs further treatment in separate apparatus. Such separate apparatus may be, (according to the reports of this method) similar to that employed in an electrothermic method in which a pot, serving as a furnace, is filled with crushed ore, carbon, and flux, and subjected to the action of an electric arc playing through the mixture. Fresh quantities of charge may be added through a chute disposed over the furnace, entering in a cold condition. Waste furnace gases are not directly utilized by passing them through the incoming charge, being diverted from the furnace through a separate pipe. In this method, the reducing action is more essentially directly between elemental carbon and ore. As stated, the charge for this furnace may consist of the partially reduced material obtained by gas reduction, but the two methods are independent in principle and in type of apparatus employed.

Aside from economic factors, which are so variable as to permit of no positive statements here, it is well known that all of these methods are open to criticism. With respect to the blast furnace method, it is recognized that the use of a blast of hot air is not entirely satisfactory. Expensive apparatus is required to preheat and feed the air. Of greater significance in the present connection is the fact that the use of a blast places a definite lower limit on the size of the ore lumps which may be used. Pieces about one inch in diameter represent the generally accepted lower limit, smaller pieces being unsuited for several reasons. Fine pieces of ore, or "breeze", either fill the interstices between the larger lumps of the charge, and so restrict the passage of the hot gases, or else they are swept away by the blast, being lost in the process and clogging the gas receiving apparatus. Another important factor is that the use of hot air, containing approximately 78 per cent of inert nitrogen, serves as a dilutent of the waste gases, reducing their heating value and limiting their application to other uses. It is also now commonly accepted that the nitrogen enters the molten metal to a limited extent, with deleterious results.

What has just been said of the blast furnace of course applies with equal force to the electrothermic method involving the use of a tower and hot blast. The direct gas reduction method, while not yet fully tested on a commercial scale, is obviously open to objection because of its admitted incompleteness, the necessity for gas feeding mechanism requiring delicate control at high temperatures, and the further disadvantage that the size of the ore particules must be so large as to prevent their displacement by the hot blast. This last objection is apparent when considering the carbon pot furnace method, wherein the large size of the particles is again necessary and there is an inefficient utilization of heat and carbon.

The present invention contemplates, in so far as is known, a different procedure than any of those heretofore proposed, and one free from the foregoing noted objections. The reduction reaction of the present invention is not dependent upon the employment of a blast of hot air nor the circulation of reducing gases, and so, at the outset, is to be distinguished from those methods noted which are predicated upon these features. The method which is contemplated involves a more direct action between carbon and ore and under such conditions as to permit of the utilization of extremely finely divided particles of ore which are reduced to an agglomerated or semi-fluent state by use of the sensible heat developed in the action, either from the arc or the sensible heat of the waste gases, or both. Thereafter the charge is injected directly into the arc itself to effect a final reduction and melting of the resulting sponge iron and gangue. In these features the present invention differs materially from the carbon reduction method previously described. The reduction is completely effected, and the molten metal separated from the slag, in one set of operations and in a unitary apparatus, and not in the separated and individual apparatus units such as previously has been suggested for utilizing both gaseous and direct carbon reduction.

Without intending to suggest that the principles of the invention are confined to the following outline and without pausing here to point out the numerous advantages and utilities of the method and attendant apparatus, it may be said in a general way that the invention is practiced advantageously in the following manner: Ore of suitable grade is mined in the usual manner and otherwise subjected to the usual preliminary treatments as in any other case of reduction. The crushed ore is then further crushed, advantageously being ground to a fine or pulverulent form so that all of it will pass, for example, a 50 mesh sieve. The ore may be ground so as to pass a 250 mesh sieve but practical considerations such as economy of operation will usually necessitate considerable tolerance above this size. It is desirable to crush the ore to a fineness which will permit of a sufficient amount of contact with carbon to insure proper reduction.

The finely ground ore is then intimately admixed with carbon, which is advantageously in the form of powdered charcoal instead of coke. Such quantities of lime, also ground, as may be required to make the charge fluxing at the temperatures subsequently encountered are also added, and the mixture then stirred until a homogeneous mass is obtained. The ideal condition would exist when each minute particle of ore was in direct contact with a similar carbon particle, so that the direct reaction of reduction could be effected with a minimum expenditure of energy. While theoretical conditions are not possible in usual practice, this homogeneity of mixture may be obtained to a sufficient degree by the manner just outlined.

The homogeneous charge is then introduced by a suitable mechanical feeding device into a cold end of a hollow and practically impervious tube, which, in the preferred form of the apparatus for practicing the method, constitutes an electrode of an electric arc furnace. By means of the feeding device, the charge of ore is forced mechanically through the electrode, which is horizontally disposed, passing from the cold end to the arc end, where its temperature is raised to the temperature of the arc, say 6000° F. During the passage, the contacting particles of ore and carbon are increased in temperature and enter into a direct reducing action, iron or the oxide, FeO, being formed, and more or less carbon monoxide and carbon dioxide being liberated. This liberated gas, of course, enters into other reducing actions with the ore, and also creates a decided pressure within the tube or electrode. The pressure of the gas tends to force the reduced charge out of the electrode and directly into the arc, into which it is discharged or ejected as a frothy, semi-molten, or spuming mass of ore in an advanced stage of reduction, spongy metallic iron, and calcareous matter which forms a slag as soon as it passes the arc and has an opportunity to collect in a pool beneath.

There are certain precautions which must be taken, in view of the character of the reactions within the tube, in order to preserve one desirable advantage of the invention, namely, the utilization of finely ground ores. As previously noted, such ores are not suited for operations involving the use of a blast, as they are blown away faster than they can be reduced. The liberation of gases within the tube would have the same effect, forcing the powdered ore into the arc with explosive violence and insufficient treatment, if the tube were packed too tightly with charging material. Accordingly, enough void space should be provided, and the rate of feeding be so adjusted, and the proportioning of the charging ingredients be so regulated, as to prevent this explosive and premature discharge of the ore. Another factor which is useful in this connection, namely, the retention of the materials in the tube for a sufficient length of time to insure a substantially complete reduction, (e. g., conversion of 90 to 95 per cent of $Fe_3O_4$ to $Fe+FeO$) is in making the charging opening terminate directly in the arc itself. The high temperature here encountered, and the approaching temperatures in the tube at adjacent points, effects a rapid reduction of the ore to its frothy condition, despite the increasing velocity imparted to it by the formation of waste gases.

After passing through the arc, and so being reduced almost completely, the ore and fluxing agents fall to a hearth which is maintained at a high temperature by the arc above. Here a complete reduction is insured, the metal forming a liquid pool at the bottom of the furnace, and the slag floating above. The molten metal and slag may be tapped off from time to time, and then utilized or further processed in known ways.

It has been pointed out that the present invention does not contemplate the use of an air blast, but on the contrary, the admission of atmospheric air is avoided as much as possible. However, the waste gases must be accommodated, and, in the preferred form of apparatus, the waste gases are led from the furnace through means serving to seal the furnace from ingress of air, but not, however, until a certain portion of the sensible heat of the gases and their reducing power has been utilized. As previously noted, the reduced material falling to the hearth of the furnace is not necessarily completely reduced. There is contemplated, in one form of apparatus, a revolving furnace, wherein, due to the revolution of the furnace, the molten mass of metal is constantly agitated and brought into contact with reducing gases in order to insure a complete reduction. These gases come from the products of reaction in the tube, and are constantly drawn off through a manifolding device to maintain a more or less constant composition of the reducing atmosphere. In passing out of the furnace, the gases flow around the hollow electrode or charging tube, giving up, by conduction, some of their sensible heat which is transferred through the tube wall to institute the reducing reactions. Thereafter, the gases are withdrawn under a suitable degree of suction which tends to draw the small amount of air leaking around the joints of the furnace into the waste gases, and so away from the molten metal. In this way the iron is protected from nitrogen.

The withdrawal of the gases may be controlled so as to provide a desired degree of pressure within the furnace,—sufficient to resist the explosive effects of the gases generated within the tube, but insufficient to force the waste gases back through the tube and into the feeding mechanism of powdered ore.

In another way of reducing the ore, there may be utilized in the tube a small portion of the waste gases, not so much to serve as a reducing agent, but as a promoter or accelerator of the direct reaction of reduction by carbon. In order to obtain the contemplated use of reducing gas in this manner, it must be recalled that a large volume of gases is liberated in the tube, and that blasts through the tube should be avoided if finely divided ore is not to be displaced. Accordingly, in forming the charge, the voids are merely saturated between the particles with carbon monoxide and carbon dioxide, so as to provide a small quantity of reducing gas which serves to institute the reduction within the tube at a lower temperature than otherwise required. This saturation may be effected by stirring quietly the mixed materials in an atmosphere of gas, or permitting a trace of gas to flow in with the mixed materials as they are about to enter the tube. In another way, there is added a little calcium carbonate or unburnt limestone to the charge, depending upon the breaking up of the carbonate at a low temperature into lime and $CO_2$ to provide the promoting agent. As stated, a promoter must be used with an appreciation of its purpose, which may otherwise be stated as a means to effect a more gradual development of the reaction to prevent the sudden formation of large volumes of gas having an explosive effect on the charge.

The apparatus may assume various forms, but the charging tube should be horizontal, or inclined to the horizon at an angle less than the angle of repose of the charge. The use of a revolving or oscillating furnace, to stir the molten charge, is advantageous, but a stationary furnace may be employed. A rather long furnace may be used, with the waste gases flowing around the charging tube, in order to utilize a greater amount of their sensible heat, and to effect other economies in operation. Graphite electrodes have the longest life, but a charging tube made of firebrick may be used and a carbon arc placed at its end. The charging tube should have a smooth bore, to prevent clogging, and a positive means should be employed to force the charge through the tube. Vertical tubes will not serve, as the charges would fall through them too rapidly to permit of any effective reduction.

A fuller understanding of the invention may be had by reference to the following description taken in connection with the drawings, wherein.

Figure 1:
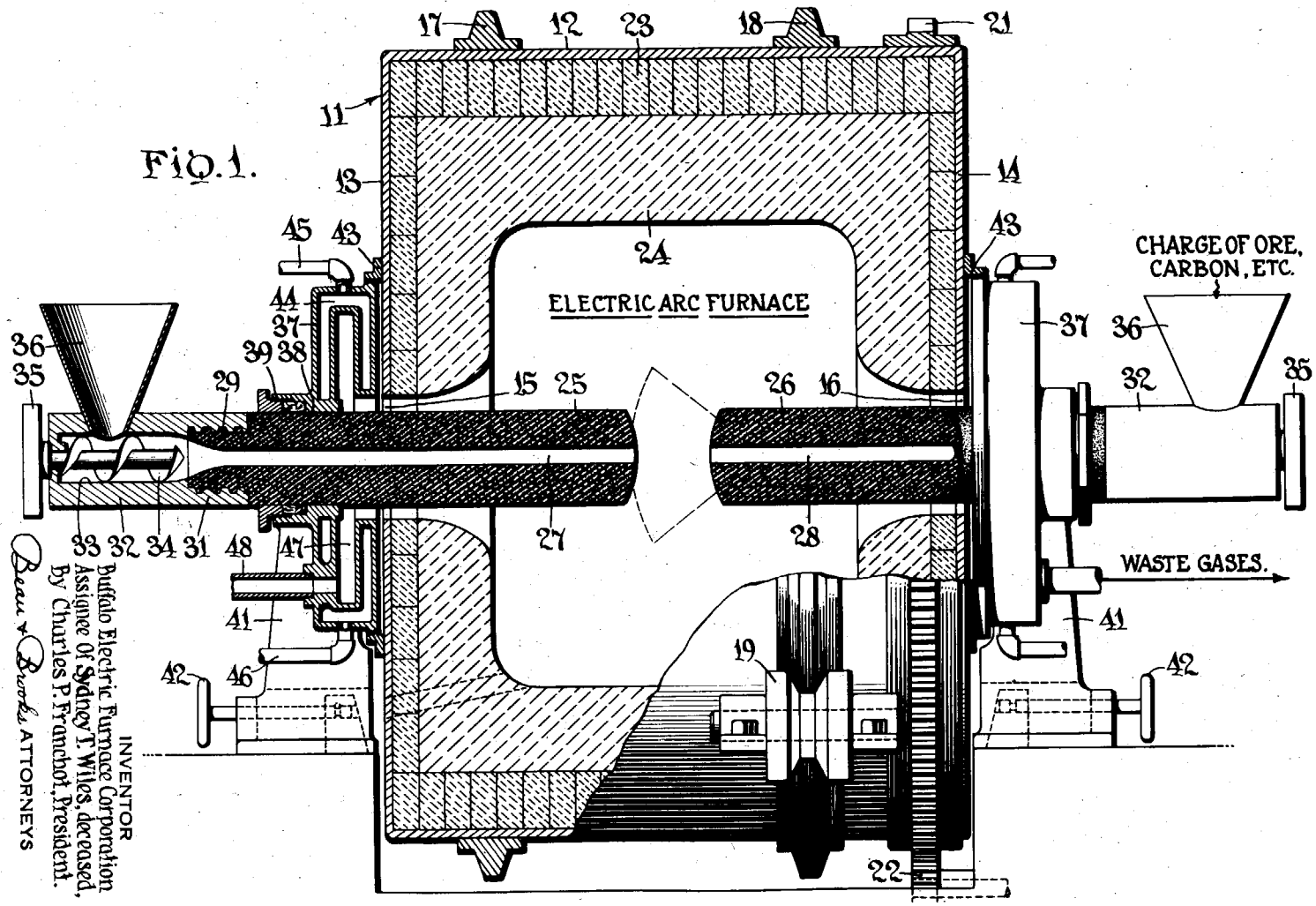
Fig. 1 is a view, partially in cross-section and partially in side elevation, of a revolving furnace suitable for reducing the ore according to the present process.

The apparatus shown in Fig. 1 consists of a cylindrical shell 11 of metal having a cylindrical side wall 12 and end walls 13 and 14 which are axially bored as indicated by the numerals 15 and 16 to provide aligned openings. The side wall 12 is provided with a pair of spaced circumferentially continuous metal tracks 17 and 18 which rest in grooves formed in fixed supporting rollers mounted at either end and on opposite sides of the shell. One of these is illustrated and indicated by the reference numeral 19. A gear track 21 is also secured to the side wall 12 for engagement with a driving gear 22, by means of which the shell may be rotated or oscillated.

The shell 11 is lined with a layer of fire brick 23 and a wall 24 of magnesite, or other suitable heat resisting material. These protective layers are discontinuous around the axial openings in the end walls of the shell 11, to provide means for entering the interior of the furnace. Tap holes for the slag and molten metal are provided at suitable places in the lining and shell, in accordance with usual practice.

Projecting into the furnace through the openings 15 and 16 are graphite electrodes 25 and 26, each being suitably supported and capable of longitudinal adjustment, and also being provided with cooling means to maintain the outer ends of the electrodes at a low temperature. Each electrode is provided with a smooth hollow portion along its axis, as indicated by the numerals 27 and 28. The charge is fed into the furnace through these tubes. The electrodes may be made of any desired length and be formed with male and female threaded ends, so that a fresh electrode may be attached to the outer end of an old electrode. There is shown in the drawings but one electrode section, but it will be understood that more may be used. The extreme outer end of each electrode is provided with a threaded connection 29 for interengagement with a threaded end 31 of a feeding device to force the charge into the furnace. The device illustrated consists of a metal tube 32 having a bore 33 in which is disposed a screw conveyor 34, driven by means of a wheel 35 connected to a suitable source of power, not shown. A chute or hopper 36 is positioned on the top portion of the tube 32, and through it the charge may be fed to the screw conveyor, and so forced on through the electrode and into the furnace. The feeding device is of course rather schematically illustrated, and may assume a variety of forms.

Surrounding each electrode at its point of exit from the furnace is a cooling device which is also employed to remove waste gases from the furnace. The device consists of an annular metallic member 37 provided with an axial bore 38 for the reception of the electrode, and it is formed on its outer end with a gland 39 that may be filled with packing material such as kieselguhr. The member 37 is mounted on a pedestal 41 which is longitudinally adjustable on a fixed base by means of a worm operated through a hand wheel 42. The member 37 may thus be moved with respect to the end walls of the furnace, and so form a very narrow gap through which air might seep into the furnace. This gap is further sealed by means of annular flanges 43 formed on the side walls 13 and 14 which surround the member 37. Packing rings of carbon may further be positioned between the members 37 and the flanges 43.

The member 37 is formed with a closed internal chamber 44 for cooling liquid which is introduced and removed through pipes 45 and 46. Enclosed by the several portions of the chamber 44 is an annular chamber 47 which is open at its inner portions for direct communication with the openings in the furnace end walls. The chamber 47 is in communication with a gas holder, scrubber, or similar device by means of a pipe line 48 leading through a suitable fan or like means for withdrawing gases from the furnace. During the course of operation, the waste gases liberated in the furnace are drawn into the chamber 47 and so on out of the system, being disposed of in a variety of economical ways. The flow of gas through the openings 15 and 16 induces a slight flow of air through the narrow gap between the furnace wall and the member 37, and any air tending to leak into the furnace is accordingly diverted into the waste gas stream where it can do no harm. This slight suction action is desirable for the further reason that it prevents the escape of the flammable and poisonous waste gases into the air around the furnace. The cooling chamber 37, besides serving to prevent leakage of air into the furnace by virtue of its adjustability, also cools the electrode so that the outer end is at room temperature. It will be noted that with this arrangement, the reactions in the tube are effected in the short distance between the furnace wall and the arc.

In operation, the furnace is brought up to the required temperature and the powdered charge is fed into the arc through the tubes 27 and 28. In beginning the feeding, it may be desirable to force rather heavy material into the tube at first, so that a greater resistance to the liberated gases is encountered, and explosive and premature discharge will not ensue. Thereafter, the regular fine charge is used. As the charge comes into the zone of reaction at the furnace wall, the first stages of reduction occur, the gradually reducing charge being forced along the tube into regions of higher temperature, and finally, as previously described, being ejected in an advanced stage of reduction, into the furnace itself. As the furnace rotates, the growing layer of molten metal and slag at the lower side of the furnace is stirred and agitated, some portions of it being carried up with the furnace wall in thin layers where it is washed with the atmosphere of reducing gases maintained within the furnace.

The liberated gases are constantly being withdrawn by means of the suction apparatus, flowing around the electrodes as they leave the furnace to supply part of the heat necessary to effect the initial reduction. These gases do not, however, come into direct contact with the charge in the tube. The suction applied is so chosen as to prevent the gases from back-firing through the tube, but a pressure within the furnace which will prevent explosive discharge from the tube is also maintained. The temperature or current consumption may be regulated by longitudinal adjustment of the electrodes 25 and 26, or by changing the voltage between them. The rate of feeding, and hence length of treatment in the tube, may also be adjusted by changing the speed of the screw conveyor 34; and, of course, it is obvious that the character of the charge itself may be varied over wide limits. This flexibility of adjustment and ease of control render the method and apparatus applicable to a wide variety of ores and for use in the manufacture of a number of products.

After the requisite amount of charging stock has been fed into the furnace the molten bath is laved in the reducing atmosphere to insure complete reduction and such degree of purification as may be desired. When the operation is complete the tap holes are knocked through the side wall of the furnace and the molten slag and metal run off separately to solidify. As soon as the reduced material is withdrawn the feeding may again be started, the furnace being rotated and fresh quantities of charge being added. In some cases the rotation of the furnace need take place only after the feeding has ceased, the subsequent agitation or puddling being done on the complete molten charge to obtain a final purification.

It will of course be understood that much auxiliary apparatus other than that illustrated is employed in the operation of a commercial plant, but as such devices are known they need not be discussed in detail here.

Figure 3:
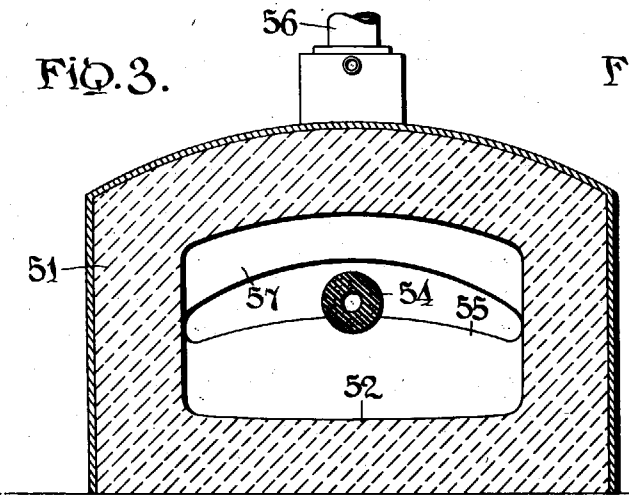
Fig. 3 is a transverse cross-sectional view of the apparatus shown in Fig. 2.
Figure 2:
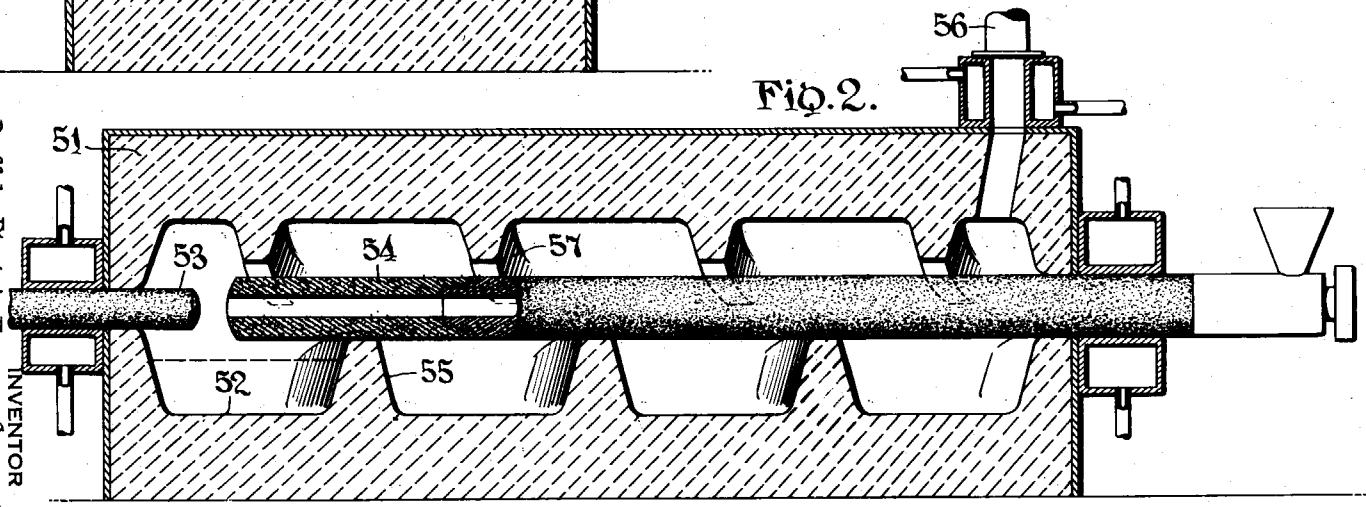
Fig. 2 is a longitudinal cross-sectional view of a stationary type of furnace.

The apparatus shown in Figs. 2 and 3 comprises a rather long furnace 51 similar in construction to the furnace shown in Fig. 1, except that this furnace is stationary. An arc is obtained over a furnace hearth 52 by passing current between a solid electrode 53 and a hollow electrode 54 through which the charge is fed in the manner previously described. The electrode 54 is supported at a suitable number of points along its length by means of walls 55 which are so constructed as to deflect gases passing from the hearth 52 to an exit pipe 56 positioned at the end of the furnace remote from the hearth. Baffle walls 57, which are more or less angularly disposed to the axis of the furnace, are formed in the roof portion and, in association with the walls 55, providing means for causing the gases to move around the electrode 54 with a spiral motion.

Due to the long length of the electrode 54, an appreciable amount of the sensible heat of the waste gases is utilized in effecting a high temperature reduction within the electrode 54. The material discharging from the tube 54 into the furnace arc 52 is practically all reduced, and the molten iron and slag may be tapped off in a continuous manner. If desired, an electrode may be vertically positioned through the roof of the furnace 51 to create a deflected arc acting upon the surface of the material on the furnace hearth.

Figure 4:
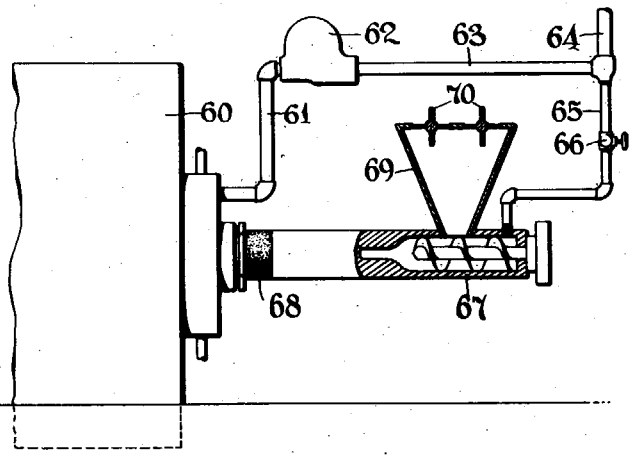
Fig. 4 is a schematic view showing means to admix reducing gas with the charge.

In Fig. 4, there is shown rather schematically one means for introducing a trace of reducing gases into the incoming charge. Gases are withdrawn from the furnace 60 through a pipe 61 and are sent to a gas holder by means of a pump 62 and pipes 63 and 64. Another pipe 65 provided with a needle valve 66 leads from the pipe 64 to the charging device 67. By proper manipulation of the valve 66 a limited amount of reducing gas may be stirred into the charge as it enters the cold end of the electrode 68. The charging hopper 69 is provided with a closed cover and the feeding is effected by means of one or more star wheels 70 positioned therein.

From the foregoing description of certain embodiments of the process and apparatus for practicing the same, it will be apparent that there is provided a novel system for treating ores or crude metals to effect their purification and reduction. In view of the applicability of the principles of the invention to a variety of materials and for a number of special purposes, it will also be appreciated that the foregoing specifications are intended to be illustrative of the invention, and do not represent the limits thereof. It will be understood therefore that the scope of the invention should be determined by the scope of the following claims.

What is claimed is:

1. The process of reducing iron ores which comprises homogeneously admixing ore, carbon, and fluxing material, to form a charge, introducing said charge into a horizontally disposed closed tube, passing the charge through the tube and through a zone of the tube of gradually increasing temperature, maintaining the rate of passage through the tube and the temperature at such values as to effect a substantial reduction of the ore prior to discharge from the tube, and maintaining the external pressure at the discharge end of the tube less than the pressure within the tube.

2. In the electrothermic reduction of iron ores, the process which comprises feeding a charge of ore, carbon, and fluxing material into an electric arc furnace through a horizontally disposed hollow tube formed in a furnace electrode.

3. The process of reducing iron ores to metallic iron which comprises finely dividing and homogeneously admixing iron ore, carbon, and a fluxing agent to form a charge, forcing said charge through a substantially horizontally disposed hollow tube into an electric furnace, and withdrawing gases generated in the ensuing actions from the furnace at a low pressure preventing the back flow of said gases through the incoming charge.

4. The method of reducing iron ores which comprises finely dividing and homogeneously admixing iron ore, carbon and fluxing material, enclosing the mixture in a horizontally disposed tube, moving the charge through the tube and simultaneously subjecting the mixture to a gradually increasing temperature, thereby effecting a substantial reduction of the ore, discharging the so reduced material into a molten bath of iron and slag, stirring the molten bath in the presence of reducing gas, removing the gas exteriorly of the tube and in contact therewith, and separately removing the molten iron and slag.

5. The process of reducing iron ores which comprises homogeneously admixing finely divided iron ore, carbon and fluxing material, introducing the resulting charge into a horizontally disposed closed tube, heating the charge in the tube to a temperature at which reducing reactions will be instituted, moving the charge through the tube and simultaneously increasing the temperature, and discharging the contents of the tube into an electric arc while maintaining the pressure at the discharge end of the tube less than the pressure within the tube.

6. The process of reducing iron ores which comprises homogeneously admixing finely divided iron ore, carbon and fluxing material, further including in the mixture a limited supply of reducing gases, introducing the resulting charge into a horizontally disposed closed tube, heating the charge in the tube to a temperature at which reducing reactions will be instituted, moving the charge through the tube and simultaneously increasing the temperature, and discharging the contents of the tube into an electric arc while maintaining the pressure at the discharge end of the tube less than the pressure within the tube.

7. The process of reducing iron ores which comprises homogeneously admixing finely divided iron ore, carbon, and fluxing material to form a charge, forcing the charge into a cold end of a horizontally disposed hollow tube, passing the material through the tube and out of a hot end thereof with gradual increase in temperature of the charge within the tube to effect the reduction of the major portion of the ore, subjecting the charge to an intense heat at the discharge end of the tube, subjecting the discharged material to further heat to complete the reduction, separating the reduced iron from the slag formed in the reaction, withdrawing gases generated in the reduction from the charge exteriorly of the tube, and separately removing the reduced metal and slag from the region of final heating.

8. The process of reducing iron ores which comprises finely dividing and homogeneously admixing iron ore, carbon, and fluxing material to form a charge, enclosing the charge in a horizontally disposed hollow tube, moving the mass through the tube and into regions of progressively increasing temperature to effect a substantial reduction of the ore, simultaneously maintaining the charge shielded from drafts of reducing gases formed by the complete reduction of the ore, discharging the partially reduced charge into an electric arc and into an atmosphere rich in carbon monoxide, heating the discharged mass in such atmosphere to effect a complete reduction of the ore to metal, and continuously withdrawing a major portion of the gases formed in the reducing reactions from the region of the arc.

9. In the preparation of ferriferous metals from ores, the process which comprises homogeneously mixing finely divided ore and a reducing agent, providing an electric arc between horizontally disposed non-metallic electrodes formed with longitudinally extending bores, heating the inner portion of said electrodes progressively from the ends remote from the arc to said arc, forcibly feeding the said mixture through said bores from the cold ends of the electrode and through the arc, and controlling the rate of movement of said mixture to effect the reduction thereof.

10. The method of reducing iron ores which comprises striking an electric arc between a pair of horizontally disposed and hollow carbon electrodes, enclosing a portion of said electrodes within a refractory housing, heating the enclosed portions of the electrodes from the arc end toward the cold end, maintaining a reducing atmosphere around the heated portion of the electrodes, and forcibly feeding under controlled conditions a homogeneously mixed and finely divided charge of ore, carbon, and fluxing agent and a limited quantity of reducing gas through said hollow electrodes from the exposed end to the arc ends thereof.

11. In the electrothermic reduction of metallic ores, the process which comprises feeding a charge of ore, carbon, and fluxing material into an electric arc furnace through a horizontally disposed hollow tube formed in a furnace electrode.

12. The process of reducing metallic ores to metal which comprises finely dividing and homogeneously admixing the ore, carbon and a fluxing agent to form a charge, forcing said charge through a substantially horizontally disposed hollow tube into an electric furnace, and withdrawing gases generated in the ensuing action from the furnace at a low pressure preventing the back flow of said gases through the incoming charge.

13. The process of reducing metallic ores which comprises homogeneously admixing finely divided ore, carbon, and fluxing material to form a charge, forcing the charge into a cold end of a horizontally disposed hollow tube, passing the material through the tube and out of a hot end thereof with gradual increase in temperature of the charge within the tube to effect a partial reduction of the ore, subjecting the charge to an intense heat at the discharge end of the tube, subjecting the discharged material to further heat to complete the reduction, separating the reduced metal from the slag formed in the reaction, withdrawing gases generated in the reduction from the charge, and separately removing the reduced metal and slag from the region of final heating.

14. A method of propagating endothermic reactions in charges of solid material which comprises moving a charge of the solid material which has been finely divided through a substantially horizontal conduit formed in an electrode of an electric arc, and controlling the rate of movement of said charge through said electrode from the feeding end of the conduit relatively remote from the arc end of the electrode.

15. A method of propagating endothermic reactions which comprises creating an electric arc between substantially horizontally disposed electrodes, providing a conduit through at least one of said electrodes, introducing a charge of solid material into said conduit at the end thereof remote from the arc, forcibly feeding said finely divided charge through the electrode and into the arc, introducing a quantity of gas into the remote end of the electrode, and maintaining a pressure on said gas to insure its movement through the electrode with said charge.

16. A method of electrothermally treating chemically reactive materials which comprises forming openings longitudinally through a pair of elongated electrodes normally arranged substantially horizontally in opposed relation, electrically energizing the electrodes to form an electric arc between adjacent ends thereof, feeding the reactive materials into the ends of the electrodes opposite the arc to maintain the last mentioned ends substantially closed by the reactive materials, and progressively conducting the reactive materials through the electrodes at such rate as to allow chemical reaction to take place before said materials reach the electric arc, thereby defining the zones of reaction inside the electrodes between the confining boundaries of the unreacted materials and the electric arc.

17. The method of electrothermally treating chemically reactive substances which comprises forming an electrode with communicating entrance and exit openings therein, feeding the reactive substances through the electrode while the latter is in a substantially horizontal position, energizing a portion of the electrode by an electric arc to temperatures causing chemical reaction of the reactive substances inside the electrode, and discharging the reacted substances into the region of the electric arc.

18. The method of electrothermally treating reactive materials which comprises feeding charges of reactive materials through a carbonaceous electrode having entrance and exit openings communicating therethrough from one extremity to the other and into a space free from obstruction by any of the materials after they have been fed through the electrode, electrically energizing said electrode to provide a controlled heating arc at one end thereof, and coordinating the rate of feeding and intensity of the electric arc to insure reaction of the materials inside the electrode.

19. The method of propagating endothermic reactions in charges of solid material which comprises mechanically forcing a charge of solid material which has been finely divided through a conduit formed in a substantially horizontal electrode of an electric arc, and controlling the rate of movement of said charge through said electrode from the feeding end of the conduit relatively remote from the arc end of the electrode.

20. The method of propagating reactions at high temperatures in potentially reactive charges of pulverulent solid material, that comprises intimately admixing particles of the solid constituents of the charge, forcibly introducing the mixture into one end of a hollow substantially horizontal conduit so that it substantially fills the bore thereof in such relation that continued force is required to move the charge toward the discharge end of the conduit, discharging the mixture from the end of the conduit into a heated zone of an electric arc furnace, maintaining intermediate portions of the conduit heated by the electric arc of the furnace at elevated temperatures insuring the progress of reaction in the conduit, and feeding the pulverulent material by pressure along the bore of the conduit at such rate as to permit the charge to react and become spumous, such reaction being substantially complete before the charge is discharged from the conduit.

BUFFALO ELECTRIC FURNACE CORPORATION,
*Mesne assignee of Sydney T. Wiles, Deceased.*
By CHARLES P. FRANCHOT,
*President.*